United States Patent
Osaki et al.

(10) Patent No.: US 11,597,258 B2
(45) Date of Patent: Mar. 7, 2023

(54) AIR CONDITIONING DEVICE

(71) Applicant: Marelli Cabin Comfort Japan Corporation, Saitama (JP)

(72) Inventors: Tatsuya Osaki, Saitama (JP); Mitsuaki Nagata, Saitama (JP); Akihiro Okajima, Saitama (JP)

(73) Assignee: Marelli Cabin Comfort Japan Corporation, Saitama (JP)

(*) Notice: Subject to any disclaimer, the term of this patent is extended or adjusted under 35 U.S.C. 154(b) by 276 days.

(21) Appl. No.: 16/465,484

(22) PCT Filed: Nov. 8, 2017

(86) PCT No.: PCT/JP2017/040316
§ 371 (c)(1),
(2) Date: May 30, 2019

(87) PCT Pub. No.: WO2018/100995
PCT Pub. Date: Jun. 7, 2018

(65) Prior Publication Data
US 2019/0291542 A1    Sep. 26, 2019

(30) Foreign Application Priority Data
Dec. 1, 2016  (JP) .............................. JP2016-234034

(51) Int. Cl.
*B60H 1/32* (2006.01)
*F25B 43/00* (2006.01)
*F25B 41/24* (2021.01)

(52) U.S. Cl.
CPC ......... *B60H 1/3229* (2013.01); *B60H 1/3228* (2019.05); *F25B 41/24* (2021.01); *F25B 43/00* (2013.01)

(58) Field of Classification Search
CPC .......... F25B 43/00; F25B 41/20; F25B 41/24; B60H 1/3228; B60H 1/3229
See application file for complete search history.

(56) References Cited

U.S. PATENT DOCUMENTS 5,704,226 A * 1/1998 Beckwith ............. B60H 1/3229
62/503
2013/0186131 A1  7/2013 Guitar
(Continued)

FOREIGN PATENT DOCUMENTS

JP        S63315874 A   12/1988
JP        H0492714 A    3/1992
(Continued)

*Primary Examiner* — Tavia Sullens
(74) *Attorney, Agent, or Firm* — Young Basile Hanlon & MacFarlane, P.C.

(57) ABSTRACT

This air conditioning device, which is installed in a vehicle, is provided with a gas-liquid separator which separates liquid-phase refrigerant and gas-phase refrigerant, guides, to a compressor, the gas-phase refrigerant flowing in from an outdoor heat exchanger during heating operations, and guides, to an expansion valve, the liquid-phase refrigerant flowing in from the outdoor heat exchanger during cooling operations. The gas-liquid separator is provided further rearward inside the vehicle than the outdoor heat exchanger. The compressor is provided further rearward inside the vehicle than the gas-liquid separator.

8 Claims, 7 Drawing Sheets

(56) References Cited

U.S. PATENT DOCUMENTS

| | | | |
|---|---|---|---|
| 2014/0305154 A1 | 10/2014 | Yoshioka et al. | |
| 2015/0122452 A1* | 5/2015 | Iino | B60H 1/3229 165/41 |
| 2017/0267063 A1* | 9/2017 | Shan | B60H 1/3229 |

FOREIGN PATENT DOCUMENTS

| | | | |
|---|---|---|---|
| JP | 10311624 A | * | 11/1998 |
| JP | 2003042599 A | | 2/2003 |
| JP | 2004306686 A | | 11/2004 |
| JP | 2005114283 A | | 4/2005 |
| JP | 2005219704 A | | 8/2005 |
| JP | 2006327350 A | | 12/2006 |
| JP | 2007145104 A | | 6/2007 |
| JP | 2008094382 A | | 4/2008 |
| JP | 2013148229 A | | 8/2013 |
| JP | 2013535372 A | | 9/2013 |
| KR | 20130057082 A | | 5/2013 |
| WO | 2013088946 A1 | | 6/2013 |

* cited by examiner

AIR CONDITIONING DEVICE

CROSS REFERENCE TO RELATED APPLICATION

This application claims priority to Japanese Patent Application Serial No. 2016-234034, filed Dec. 1, 2016, the entire disclosure of which is hereby incorporated by reference.

TECHNICAL FIELD

The present invention relates to air conditioning devices.

BACKGROUND

JP 2013-535372 A discloses an air conditioning loop that can be switched between a cooling mode and a heating mode. The air conditioning loop includes components such as a compressor, an external heat exchanger, an internal heat exchanger, and an evaporator. These components are connected with one another by piping.

However, in the air conditioning loop of JP 2013-535372 A, no specific aspect is disclosed regarding how the components are connected by piping.

SUMMARY

An object of the present invention is to connect components with a simple piping configuration in an air conditioning device capable of performing cooling operation and heating operation.

According to an aspect of the present invention, an air conditioning device configured to be mounted on a vehicle includes: a compressor for compressing refrigerant; an exterior heat exchanger for exchanging heat between the refrigerant and external air; an evaporator for evaporating the refrigerant by causing the refrigerant to absorb the heat of air guided into a vehicle compartment of the vehicle; a heater for heating the air guided into the vehicle compartment by using the heat of the refrigerant compressed by the compressor; an expansion valve, provided between the exterior heat exchanger and the evaporator, for decompressing and expanding the refrigerant that has passed through the exterior heat exchanger; a throttle mechanism, provided between the compressor and the exterior heat exchanger, for decompressing and expanding the refrigerant compressed by the compressor; a gas-liquid separator for separating liquid phase refrigerant and gas phase refrigerant from each other, guiding the incoming gas phase refrigerant from the exterior heat exchanger into the compressor during heating operation, and guiding the incoming liquid phase refrigerant from the exterior heat exchanger into the expansion valve during cooling operation; a first flow path switching valve for switching a flow path of the refrigerant so as to bypass the expansion valve and the evaporator during heating operation; and a second flow path switching valve for switching a flow path of the refrigerant so as to bypass the heater and the throttle mechanism during cooling operation, wherein the gas-liquid separator is disposed in the vehicle closer to a rear part of the vehicle than the exterior heat exchanger, and the compressor is disposed in the vehicle closer to the rear part of the vehicle than the gas-liquid separator.

In the above aspect, the gas-liquid separator is disposed in the vehicle closer to the rear part of the vehicle than the exterior heat exchanger, and the compressor is disposed in the vehicle further closer to the rear part than the gas-liquid separator. Thus, since the exterior heat exchanger, the gas-liquid separator, and the compressor are connected in order along the front-rear direction of the vehicle, the length of the piping connecting the components can be minimized. Therefore, the components can be connected with a simple piping configuration.

DETAILED DESCRIPTION

An air conditioning device 100 according to an embodiment of the present invention will be described below with reference to the drawings.

Figure 1:
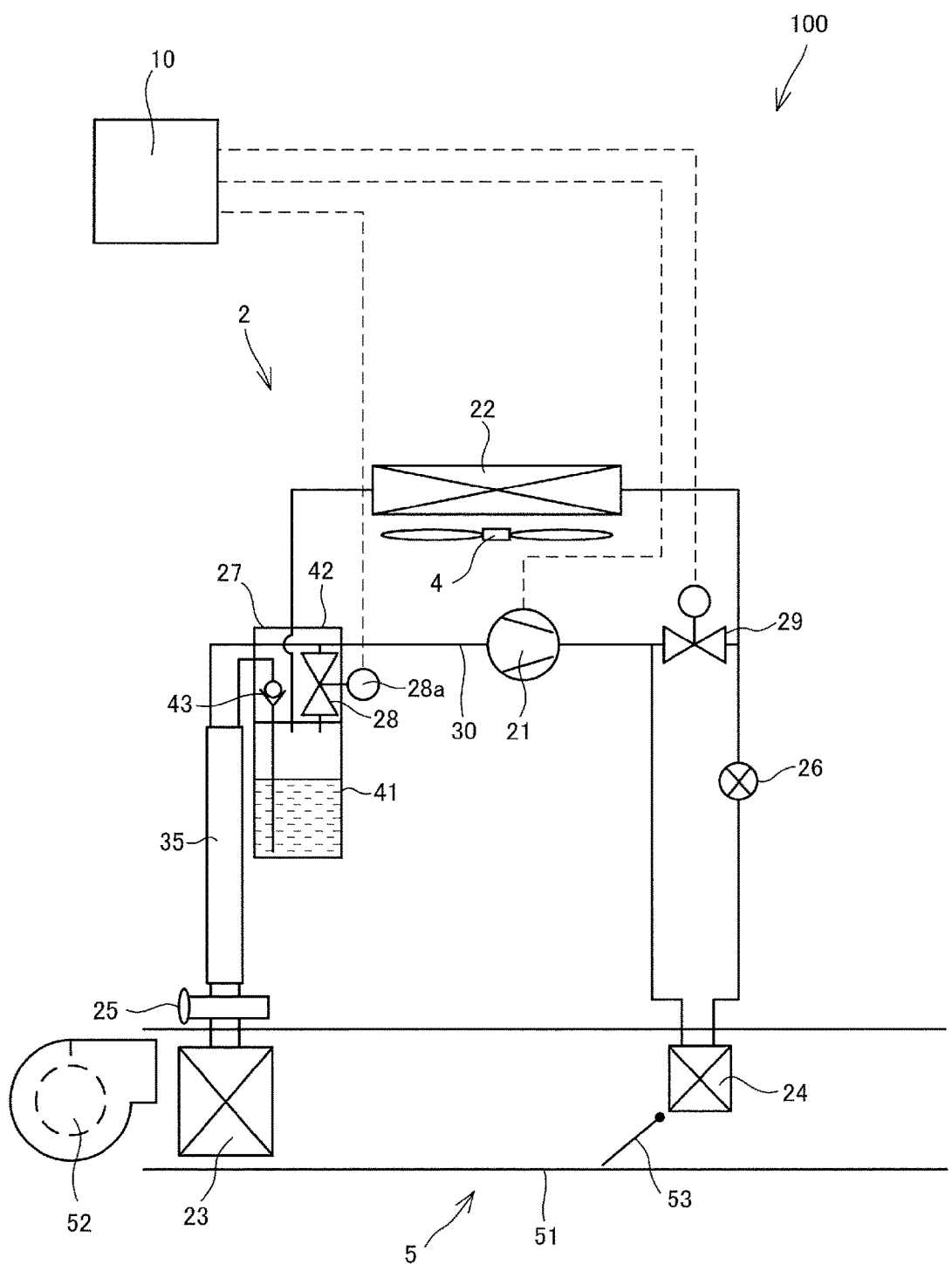
FIG. 1 is a configuration diagram of an air conditioning device according to an embodiment of the present invention.

As shown in FIG. 1, the air conditioning device 100 includes a refrigeration cycle 2 through which refrigerant circulates, a heating, ventilation, and air conditioning (HVAC) unit 5 through which air for use in air conditioning passes, and a controller 10 as a control unit for controlling the operation of the air conditioning device 100. The air conditioning device 100 is a heat pump system capable of performing cooling and heating operation. The air conditioning device 100 is mounted on a vehicle (not shown) to perform air conditioning in a vehicle compartment (not shown).

The refrigeration cycle 2 includes a compressor 21 as a compressor, an exterior heat exchanger 22, an internal heat exchanger 35, a heat exchanger for cooling 23 as an evaporator, a heat exchanger for heating 24 as a heater, a thermal expansion valve 25 as an expansion valve, a fixed throttle 26 as a throttle mechanism, a gas-liquid separator 27, and a refrigerant flow path 30 connecting these components so as to allow circulation of refrigerant through these components. The refrigerant flow path 30 is provided with a first flow path switching valve 28 and a second flow path switching valve 29. The refrigerant circulating in the refrigeration cycle 2 is, for example, HFO-1234yf.

The compressor 21 sucks and compresses gaseous (gas phase) refrigerant. The gaseous refrigerant is thus made to have a high temperature and a high pressure.

The exterior heat exchanger 22 is arranged, for example, in an engine room (a motor room in an electric vehicle) 3 of a vehicle, and exchanges heat between refrigerant and external air. The exterior heat exchanger 22 functions as a condenser during cooling, and functions as an evaporator during heating. The external air is introduced into the exterior heat exchanger 22 by traveling of the vehicle and by rotation of an exterior fan 4.

The heat exchanger for cooling 23 is arranged in the HVAC unit 5. When the heat pump operation mode is cooling operation, the heat exchanger for cooling 23 evaporates refrigerant by causing the refrigerant to absorb heat of air guided to the vehicle compartment. The refrigerant evaporated by the heat exchanger for cooling 23 flows into the gas-liquid separator 27 through the internal heat exchanger 35.

The heat exchanger for heating 24 is arranged in the HVAC unit 5. When the heat pump operation mode is heating operation, the heat exchanger for heating 24 functions as a condenser for condensing refrigerant having passed through the compressor 21. The heat exchanger for heating 24 heats air guided into the vehicle compartment by causing the air to absorb heat of refrigerant. The refrigerant condensed by the heat exchanger for heating 24 flows into the fixed throttle 26.

The thermal expansion valve 25 is arranged between the internal heat exchanger 35 and the heat exchanger for cooling 23, and decompresses and expands liquid (liquid phase) refrigerant guided from the exterior heat exchanger 22 through the gas-liquid separator 27 and the internal heat exchanger 35. The thermal expansion valve 25 automatically adjusts the opening degree depending on the temperature of the refrigerant having passed through the heat exchanger for cooling 23, that is, the superheating degree of the gaseous refrigerant.

When the load of the heat exchanger for cooling 23 increases, the superheating degree of the gaseous refrigerant increases. As a result, the opening degree of the thermal expansion valve 25 increases, and the amount of the refrigerant increases so as to adjust the superheating degree. On the other hand, when the load of the heat exchanger for cooling 23 decreases, the superheating degree of the gaseous refrigerant decreases. As a result, the opening degree of the thermal expansion valve 25 decreases, and the amount of the refrigerant decreases so as to adjust the superheating degree. In such a manner, the thermal expansion valve 25 feeds back the temperature of the gaseous refrigerant having passed through the heat exchanger for cooling 23 to adjust the opening degree such that the gaseous refrigerant has an appropriate superheating degree.

The internal heat exchanger 35 exchanges heat between refrigerant upstream of the thermal expansion valve 25 and refrigerant downstream of the heat exchanger cooling 23 by using a temperature difference.

The fixed throttle 26 is arranged between the heat exchanger for heating 24 and the exterior heat exchanger 22, and decompresses and expands refrigerant compressed by the compressor 21 and condensed by the heat exchanger for heating 24. As the fixed throttle 26, for example, an orifice or a capillary tube is used. The throttle amount of the fixed throttle 26 is set in advance to correspond to a frequently used specific operating condition. In place of the fixed throttle 26, for example, an electromagnetic valve capable of adjusting the opening degree in a stepwise or stepless manner may be used as a variable throttle (throttle mechanism).

The gas-liquid separator 27 temporarily stores refrigerant flowing through the refrigerant flow path 30, and causes the refrigerant to undergo gas-liquid separation into gaseous refrigerant and liquid refrigerant. During heating operation, the gas-liquid separator 27 guides incoming gaseous refrigerant from the exterior heat exchanger 22 to the compressor 21. Only the separated gaseous refrigerant flows from the gas-liquid separator 27 to the compressor 21. During cooling operation, the gas-liquid separator 27 guides incoming liquid refrigerant from the exterior heat exchanger 22 to the thermal expansion valve 25 through the internal heat exchanger 35. Only the separated liquid refrigerant flows from the gas-liquid separator 27 to the thermal expansion valve 25. The gas-liquid separator 27 includes a tank unit 41 and a piping connection unit 42.

The tank unit 41 stores refrigerant therein, and separates gaseous refrigerant and liquid refrigerant from each other by gravity. The tank unit 41 is provided such that the central axis thereof is vertical. In the tank unit 41, the liquid refrigerant stays in a lower part, and the gaseous refrigerant stays in a space above the liquid refrigerant.

The piping connection unit 42 is provided on top of the tank unit 41, and forms an inlet and an outlet for refrigerant from the tank unit 41. The piping connection unit 42 includes the first flow path switching valve 28 and a differential pressure valve 43. All the pipings connected to the gas-liquid separator 27 are collected in the piping connection unit 42. It is therefore possible to omit piping that is required when providing the first flow path switching valve 28 and the differential pressure valve 43 externally, and to simplify the piping for connecting the gas-liquid separator 27 to other components.

The differential pressure valve 43 opens when the pressure of refrigerant guided to the thermal expansion valve 25 exceeds a set pressure during cooling operation. The set pressure is set to such a pressure that the differential pressure valve 43 would not open during heating operation but the differential pressure valve 43 would open only during cooling operation. Providing the differential pressure valve 43 can prevent refrigerant from flowing into the heat exchanger for cooling 23 from the gas-liquid separator 27 through the thermal expansion valve 25 during heating operation.

The first flow path switching valve 28 switches the flow of refrigerant by opening and closing. The first flow path switching valve 28 is an electromagnetic valve including a solenoid 28a controlled by the controller 10. Providing the first flow path switching valve 28 integrally in the piping connection unit 42 can simplify the piping, and can simplify the configuration of the entire air conditioning device 100.

During cooling operation, the first flow path switching valve 28 is closed. As a result, the refrigerant condensed at the exterior heat exchanger 22 flows into the gas-liquid separator 27, and the liquid refrigerant passes through the internal heat exchanger 35, the thermal expansion valve 25, and the heat exchanger for cooling 23 and returns to the gas-liquid separator 27 again. Since the first flow path switching valve 28 is closed, the gaseous refrigerant having returned to the gas-liquid separator 27 would not flow into the tank unit 41 of the gas-liquid separator 27, but flows through the piping connection unit 42 and is guided directly to the compressor 21. On the other hand, during heating operation, the first flow path switching valve 28 is opened. As a result, the refrigerant evaporated at the exterior heat exchanger 22 flows into the gas-liquid separator 27, passes through the first flow path switching valve 28, and is guided to the compressor 21. Thus, during heating operation, the refrigerant flows to bypass the internal heat exchanger 35, the thermal expansion valve 25, and the heat exchanger for cooling 23.

In a state where the first flow path switching valve 28 is opened, the refrigerant flowing from the interior of the tank unit 41 through the first flow path switching valve 28 flows easier than the refrigerant from the interior of the tank unit 41 passing through the internal heat exchanger 35, the thermal expansion valve 25, and the heat exchanger for cooling 23 and returning to the gas-liquid separator 27 again since the former refrigerant has a smaller flow path resistance than that of the latter refrigerant. Thus, even when the differential pressure valve 43 is not provided, there is generated no refrigerant flow from the interior of the tank unit 41 passing through the internal heat exchanger 35, the thermal expansion valve 25, and the heat exchanger for cooling 23 and returning to the gas-liquid separator 27 again. In such a manner, the first flow path switching valve 28 switches the flow of refrigerant by simply opening and closing the flow path through which the refrigerant easily flows. Thus, since no three-way valve is provided or no plurality of on-off valves are used for switching the flow of refrigerant, the piping can be simplified, and the configuration of the entire air conditioning device 100 can be simplified.

The second flow path switching valve 29 switches the flow of refrigerant by opening and closing. During cooling operation, the second flow path switching valve 29 is opened, and the refrigerant compressed by the compressor 21 bypasses the heat exchanger for heating 24 and the fixed throttle 26 and flows directly into the exterior heat exchanger 22. On the other hand, during heating operation, the second flow path switching valve 29 is closed, and the refrigerant compressed by the compressor 21 passes through the heat exchanger for heating 24 and the fixed throttle 26 and flows into the exterior heat exchanger 22.

The HVAC unit 5 cools or heats air for use in air conditioning. The HVAC unit 5 includes a blower 52 that blows air, an air mix door 53 that adjusts the amount of air passing through the heat exchanger for heating 24, and a case 51 that encloses the blower and the air mix door so as to allow air for use in air conditioning to pass therethrough. The heat exchanger for cooling 23 and the heat exchanger for heating 24 are arranged in the HVAC unit 5. The air blown from the blower 52 exchanges heat with the refrigerant flowing through the heat exchanger for cooling 23, or with the refrigerant flowing through the heat exchanger for heating 24.

The air mix door 53 is placed on a side of the heat exchanger for heating 24 arranged in the HVAC unit 5 closer to the blower 52 of. The air mix door 53 opens to a side of the heat exchanger for heating 24 during heating, and closes the side of the heat exchanger for heating 24 during cooling. The opening degree of the air mix door 53 adjusts the amount of heat exchanged between the air and the refrigerant in the heat exchanger for heating 24.

The controller 10 is a microcomputer including a central processing unit (CPU), a read only memory (ROM), a random access memory (RAM), and the like. The controller 10 may be made up of a plurality of microcomputers. The controller 10 causes the CPU to read programs stored in the ROM, thereby allowing the air conditioning device 100 to exhibit various functions.

The controller 10 executes control of the refrigeration cycle 2. Specifically, the controller 10 sets the output of the compressor 21, and executes opening and closing control of the first flow path switching valve 28 and the second flow path switching valve 29, as indicated by broken lines in FIG. 1. Furthermore, the controller 10 executes control of the HVAC unit 5 by transmitting a not-shown output signal.

Next, cooling operation and heating operation in the heat pump operation mode of the air conditioning device 100 will be respectively described with reference to FIGS. 2 and 3.

Figure 2:
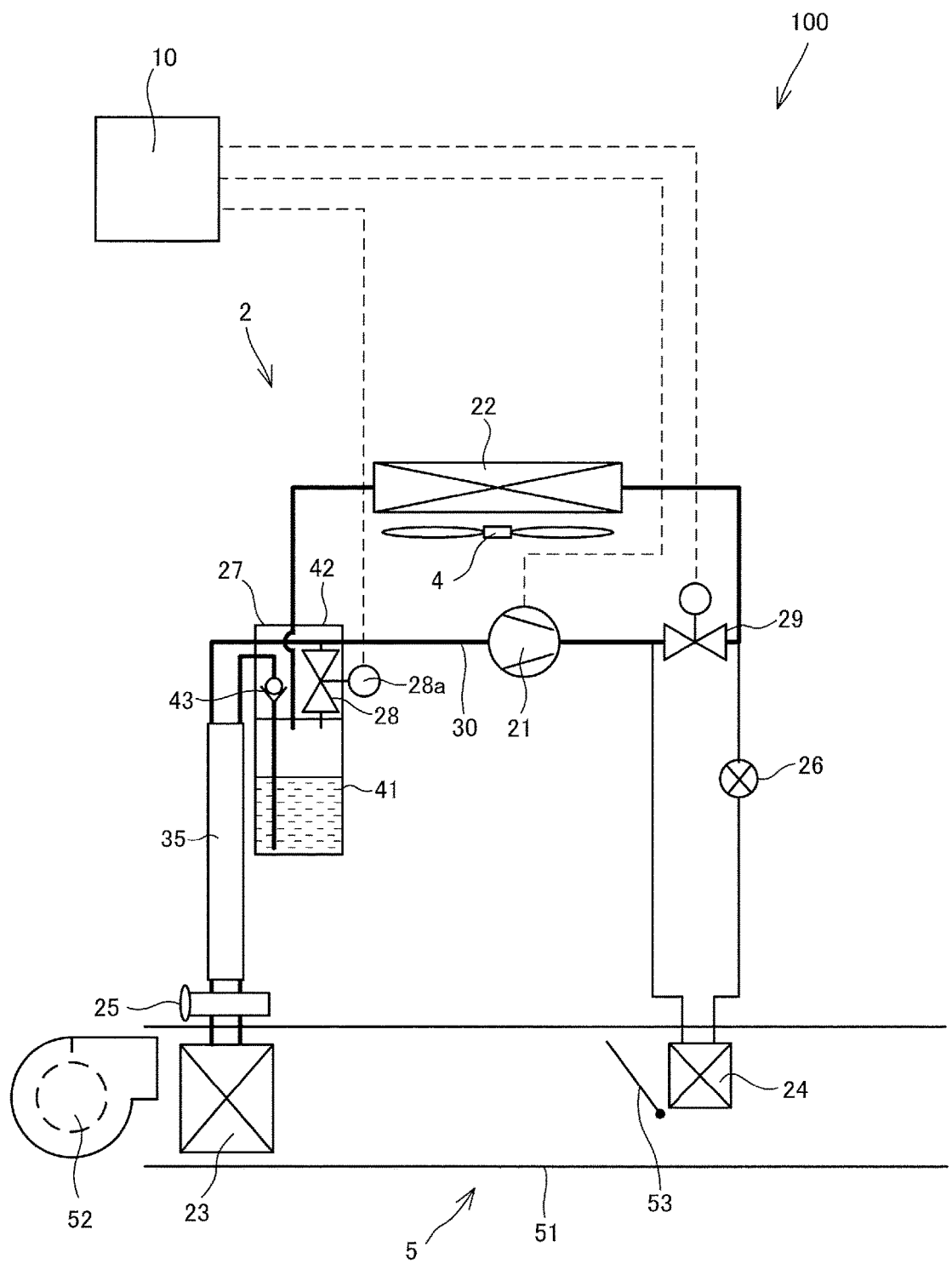
FIG. 2 is a diagram illustrating the flow of refrigerant in the air conditioning device during cooling operation.
Figure 3:
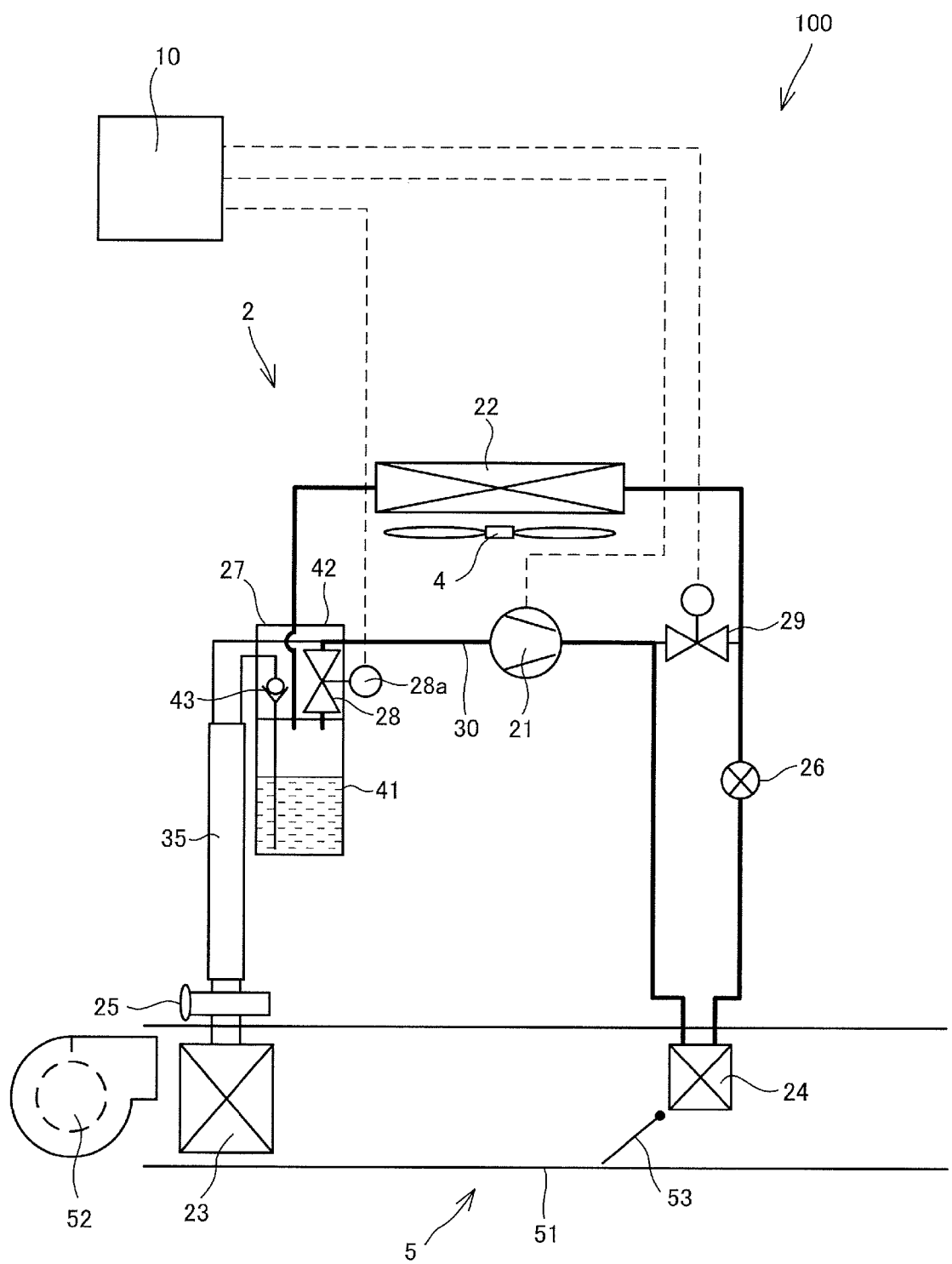
FIG. 3 is a diagram illustrating the flow of refrigerant in the air conditioning device during heating operation.

<Cooling Operation> In cooling operation, the refrigerant in the refrigerant flow path 30 circulates as indicated by a thick solid line in FIG. 2.

The controller 10 brings the first flow path switching valve 28 into a closed state, and brings the second flow path switching valve 29 into an opened state. Accordingly, the refrigerant compressed by the compressor 21 to be of a high temperature and a high pressure flows, as it is, into the exterior heat exchanger 22 through the second flow path switching valve 29.

The refrigerant having flowed into the exterior heat exchanger 22 exchanges heat with external air introduced into the exterior heat exchanger 22, and is cooled, and then passes through the gas-liquid separator 27 to thereby undergo gas-liquid separation. The liquid refrigerant out of the refrigerant having undergone the gas-liquid separation through the gas-liquid separator 27 flows to the thermal expansion valve 25 connected to the downstream side of the gas-liquid separator 27 through the internal heat exchanger 35.

Thereafter, the liquid refrigerant is decompressed and expanded by the thermal expansion valve 25 and flows to the heat exchanger for cooling 23, and evaporates by absorbing heat of air for use in air conditioning when passing through the heat exchanger for cooling 23. The gaseous refrigerant having evaporated at the heat exchanger for cooling 23 does not enter the tank unit 41 of the gas-liquid separator 27, but passes through the piping connection unit 42 and flows into the compressor 21 again.

Here, the liquid refrigerant flowing from the gas-liquid separator 27 to the internal heat exchanger 35 is a high-pressure fluid, and is in a substantially saturated liquid state having a overcooling degree of approximately 0° C. by having undergone gas-liquid separation through the gas-liquid separator 27. On the other hand, the gaseous refrigerant flowing from the heat exchanger for cooling 23 to the internal heat exchanger 35 is decompressed and expanded when passing through the thermal expansion valve 25 and is thereby made a low-temperature fluid. Thus, the liquid refrigerant exchanges heat with the low-temperature gaseous refrigerant when flowing through the internal heat exchanger 35, is excessively cooled by the gaseous refrigerant, and turns from the saturated liquid state to an overcooled state having an overcooled degree. Furthermore, the gaseous refrigerant is heated by the liquid refrigerant when flowing through the internal heat exchanger 35 and thereby turns to a heated state having a superheating degree.

The air cooled by the refrigerant in the heat exchanger for cooling 23 is flowed downstream of the HVAC unit 5 and is used as cooling air.

<Heating Operation> In heating operation, so-called external-air heat-absorbing heat pump operation is executed. In heating operation, refrigerant in the refrigerant flow path 30 circulates as indicated by a thick solid line in FIG. 3.

The controller 10 brings the second flow path switching valve 29 into a closed state, and brings the first flow path switching valve 28 into an opened state. Accordingly, the refrigerant compressed by the compressor 21 to be of a high temperature and a high pressure flows into the heat exchanger for heating 24. The refrigerant having flowed into the heat exchanger for heating 24 is deprived of heat, when heating the air inside the heat exchanger for heating 24, and is thereby made to have a low temperature, and is then decompressed and expanded through the fixed throttle 26 and is thereby made have a still lower temperature and flows into the exterior heat exchanger 22.

The refrigerant having flowed into the exterior heat exchanger 22 exchanges heat with external air guided into the exterior heat exchanger 22, absorbs heat, and then flows into the tank unit 41 of the gas-liquid separator 27 to undergo gas-liquid separation. Then, the gaseous refrigerant out of the refrigerant having undergone gas-liquid separation through the gas-liquid separator 27 passes through the first flow path switching valve 28 and flows into the compressor 21 again.

The gaseous refrigerant having flowed into the heat exchanger for heating 24 heats the air around the heat exchanger for heating 24. The heated air is caused to flow downstream of the HVAC unit 5 and is used as heating air.

Figure 4:
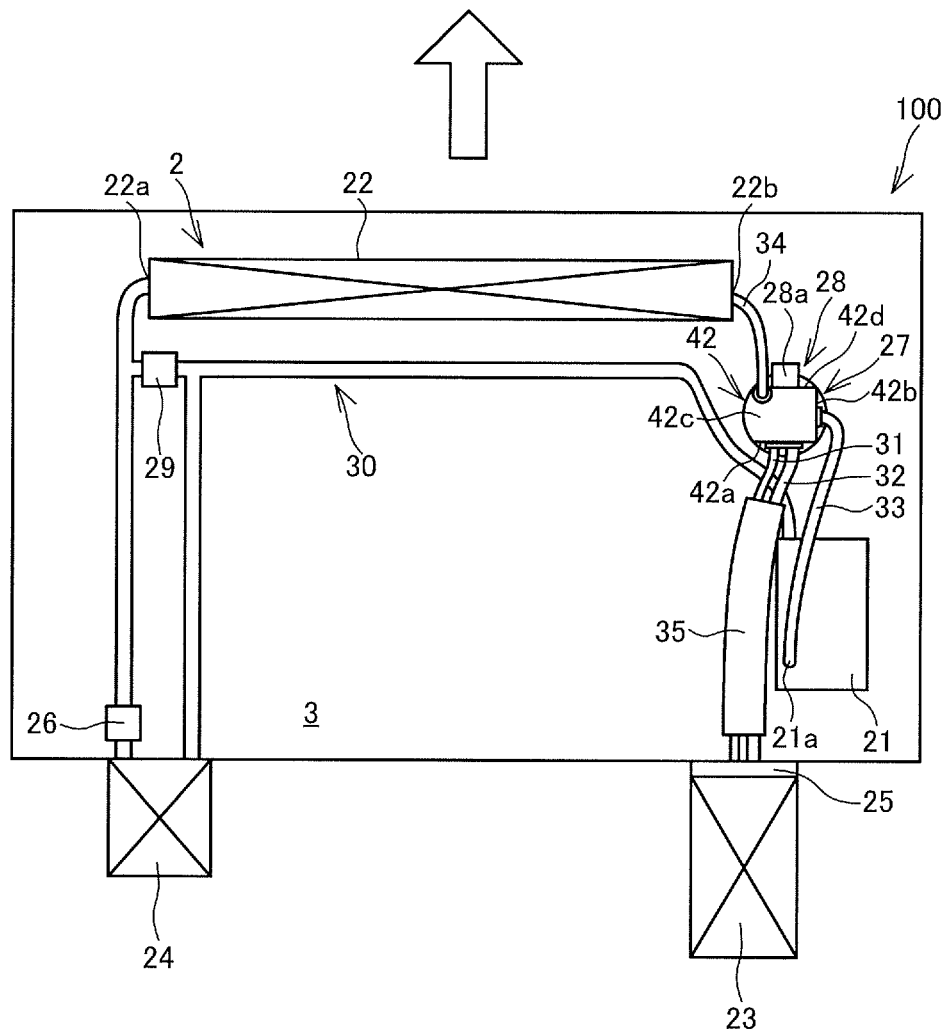
FIG. 4 is a plan view of the air conditioning device disposed in a vehicle.
Figure 5:
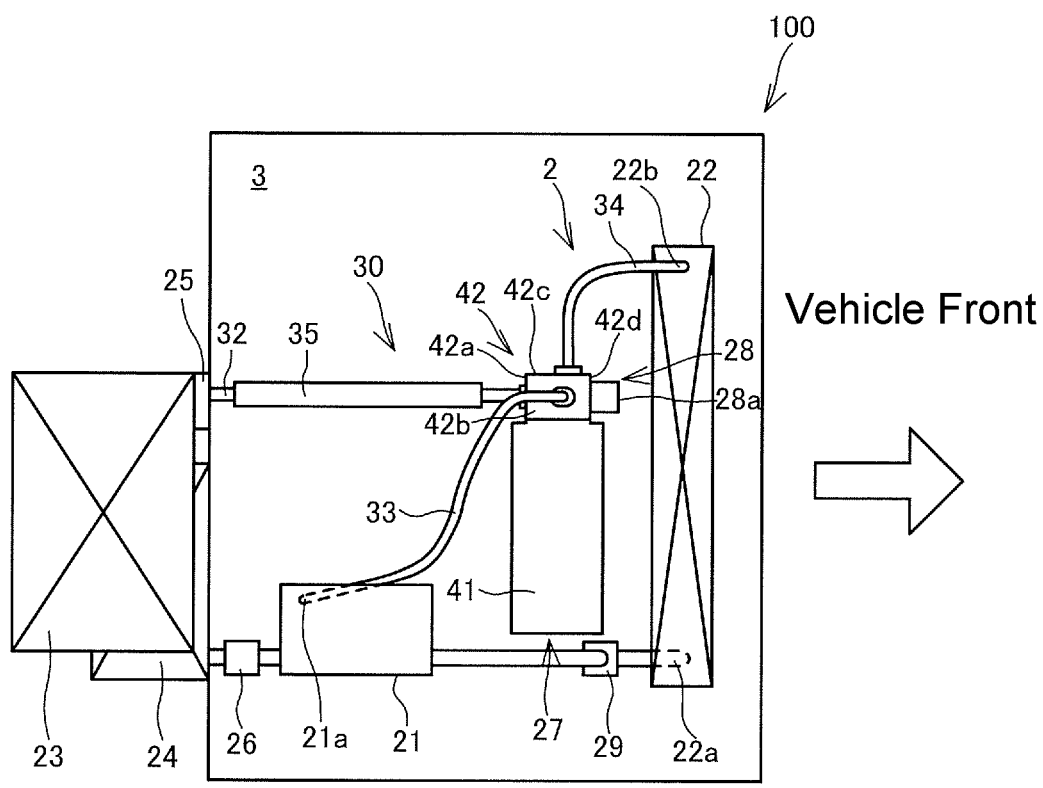
FIG. 5 is a right side view of FIG. 4.

Next, the arrangement of the components in the air conditioning device 100 will be described with reference to FIGS. 4 and 5. In FIG. 4, the upper side is the front of the vehicle, and the vehicle compartment is located on the lower side. In FIG. 5, the right side is the front of the vehicle, and the vehicle compartment is located on the left side.

As shown in FIGS. 4 and 5, the exterior heat exchanger 22 is arranged at the front end portion of the engine room 3 since the exterior heat exchanger 22 exchanges heat between the refrigerant and external air. On the other hand, the heat exchanger for cooling 23 and the heat exchanger for heating 24 are arranged at the rear end portion of the engine room 3 close to the vehicle compartment since they are provided in the HVAC unit 5 to cool or heat air guided into the vehicle compartment.

The piping connection unit 42 of the gas-liquid separator 27 includes a first connection portion 42a as an evaporator piping connection portion, a second connection portion 42b as a compressor piping connection portion, a third connection portion 42c as an exterior heat exchanger piping connection portion, and a solenoid attachment portion 42d to which the solenoid 28a of the first flow path switching valve 28 is attached.

The first connection portion 42a is a plane formed to face the rear of the vehicle. A first connection piping 31 that guides refrigerant to the thermal expansion valve 25 and a second connection piping 32, to which the refrigerant having passed through the thermal expansion valve 25 and the heat exchanger for cooling 23 returns, are connected to the first connection portion 42a. A single flange portion that integrally couples the end portions of the first connection piping 31 and the second connection piping 32 is connected to the first connection portion 42a. As a result, the connection of the piping can be facilitated.

The heat exchanger for cooling 23 is disposed in the engine room 3 closer to the rear part thereof than the gas-liquid separator 27. Thus, since the first connection portion 42a is formed so as to face the heat exchanger for cooling 23, the first connection piping 31 and the second connection piping 32 can be minimized in length.

The second connection portion 42b is a plane formed to face a lateral part of the vehicle. A third connection piping 33 that connects the gas-liquid separator 27 to the compressor 21 is connected to the second connection portion 42b. A flange portion formed at the end portion of the third connection piping 33 is connected to the second connection portion 42b.

Since the first connection portion 42a faces the rear part of the vehicle and the second connection portion 42b faces the lateral part of the vehicle, the third connection piping 33 is provided so as to form a right angle with respect to the second connection piping 32. Thus, the flow direction of the refrigerant is changed at a right angle within the piping connection unit 42. Accordingly, since the third connection piping 33 bent rearward to face the compressor 21 is connected to face the lateral of the vehicle, the routing of the piping can be simplified. Note that the piping connection unit 42 causes the second connection piping 32 and the third connection piping 33 to communicate with each other directly without passing through the tank unit 41, owing to the actuation of the first flow path switching valve 28 during cooling operation.

The third connection portion 42c is a plane formed at the upper end of the piping connection unit 42. A fourth connection piping 34 that connects the exterior heat exchanger 22 to the gas-liquid separator 27 is connected to the third connection portion 42c. A flange portion formed at the end portion of the fourth connection piping 34 is connected to the third connection portion 42c.

The solenoid attachment portion 42d is a plane formed to face the front of the vehicle. The solenoid 28a is attached to the solenoid attachment portion 42d such that a valve body (not shown) of the first flow path switching valve 28 is inserted into the piping connection unit 42.

As shown in FIG. 4, the gas-liquid separator 27 is disposed in the engine room 3 closer to the rear part thereof than the exterior heat exchanger 22. The compressor 21 is disposed in the engine room 3 still closer to the rear part thereof than the gas-liquid separator 27. Thus, since the exterior heat exchanger 22, the gas-liquid separator 27, and the compressor 21 are connected in order along the front-rear direction of the vehicle, the length of the piping connecting the components can be minimized. Therefore, the components can be connected with a simple piping configuration, and the amount of refrigerant to be contained can be reduced.

As shown in FIG. 5, the exterior heat exchanger 22 has a refrigerant outlet 22b located above a refrigerant inlet 22a thereof. The gas-liquid separator 27 fits within the height dimension of the exterior heat exchanger 22. Accordingly, the piping connecting the exterior heat exchanger 22 to the gas-liquid separator 27 can be shortened, and the height of the air conditioning device 100 as a whole can be reduced.

Furthermore, the refrigerant outlet 22b of the exterior heat exchanger 22 is disposed above the piping connection unit 42. A refrigerant suction inlet 21a of the compressor 21 is disposed below the second connection portion 42b of the piping connection unit 42 that guides refrigerant from the gas-liquid separator 27 to the compressor 21. Accordingly, the refrigerant is guided downward in order from the gas-liquid separator 27 to the compressor 21, and it is thereby possible to simplify the piping configuration and to prevent lubricating oil from staying in the exterior heat exchanger 22 or in the piping.

Here, through the fourth connection piping 34, refrigerant in a state close to a liquid phase flows during cooling operation, and refrigerant in a state close to a gas phase flows during heating operation. Considering pressure loss, it is conceivable to increase the pipe line diameter for giving priority to heating operation. However, if the piping line diameter of the fourth connection piping 34 is increased and the pipe line is lengthened, the amount of refrigerant to be contained increases because the piping through which the liquid refrigerant flows becomes longer. In order to avoid this, it is desirable to form the fourth connection piping 34 to be short.

Furthermore, it is required that the internal heat exchanger 35 have a certain amount of length in order to exchange heat between the refrigerant in the first connection piping 31 and the refrigerant in the second connection piping 32. If it is assumed that the gas-liquid separator 27 is disposed in the engine room 3 closer to the rear part thereof than the compressor 21, the length of the internal heat exchanger 35 might be insufficient. Thus, the gas-liquid separator 27 is disposed in the engine room 3 closer to the rear part thereof than the exterior heat exchanger 22, and the compressor 21 is disposed in the engine room 3 still closer to the rear part thereof than the gas-liquid separator 27.

Figure 6:
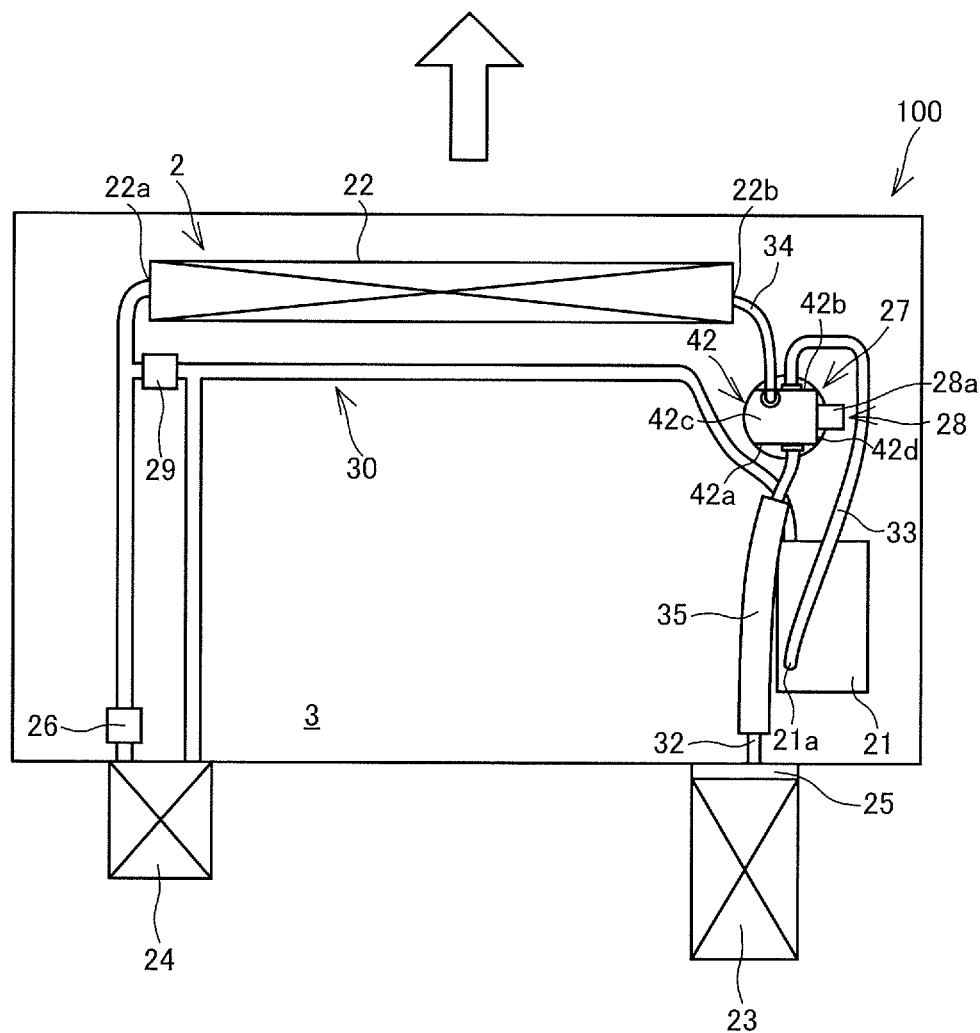
FIG. 6 is a plan view of a modification example of the air conditioning device disposed in the vehicle.
Figure 7:
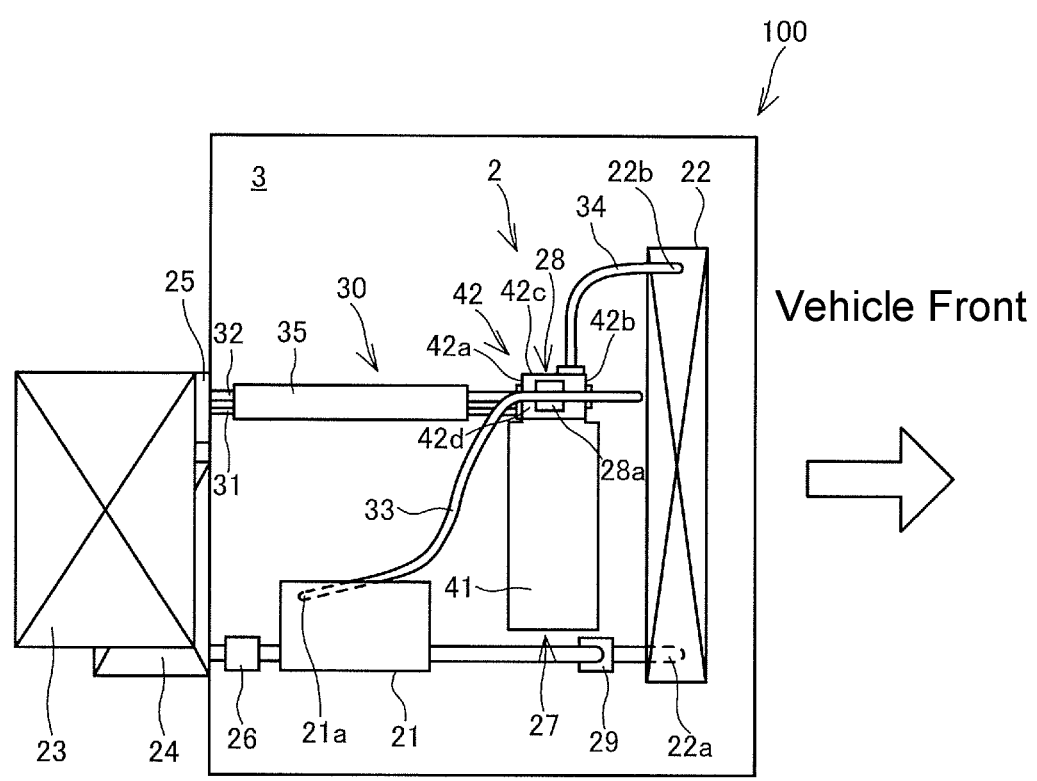
FIG. 7 is a right side view of FIG. 6.

Note that the second connection portion 42b may be formed to face the front of the vehicle, as shown in FIGS. 6 and 7. In FIG. 6, the upper side is the front of the vehicle, and the vehicle compartment is located on the lower side. In FIG. 7, the right side is the front of the vehicle, and the vehicle compartment is located on the left side.

The third connection piping 33, which connects the gas-liquid separator 27 to the compressor 21, is connected to the second connection portion 42b. Thus, the third connection piping 33 is disposed on a straight line together with the second connection piping 32, and consequently, the refrigerant would not change the direction within the piping connection unit 42 but changes the direction within the third connection piping 33, and it is therefore possible that the refrigerant flows smoothly. Note that, in this case, the solenoid attachment portion 42d to which the solenoid 28a of the first flow path switching valve 28 is attached is formed to face the lateral part of the vehicle.

According to the embodiment described above, the following effects can be obtained.

The air conditioning device 100 includes the gas-liquid separator 27 that separates liquid refrigerant and gaseous refrigerant from each other, guides the incoming gaseous refrigerant from the exterior heat exchanger 22 to the compressor 21 during heating operation, and guides the incoming liquid refrigerant from the exterior heat exchanger 22 to the thermal expansion valve 25 during cooling operation. The gas-liquid separator 27 is disposed in the vehicle closer to the rear part thereof than the exterior heat exchanger 22, and the compressor 21 is disposed in the vehicle closer to the rear part thereof than the gas-liquid separator 27.

As a result, since the exterior heat exchanger 22, the gas-liquid separator 27, and the compressor 21 are connected in order along the front-rear direction of the vehicle, the length of the piping connecting the components can be minimized. Therefore, the components can be connected with a simple piping configuration, and the amount of refrigerant to be contained can be reduced.

Furthermore, in the air conditioning device 100, the refrigerant outlet 22b of the exterior heat exchanger 22 is disposed above the piping connection unit 42, and the refrigerant suction inlet 21a of the compressor 21 is disposed below the second connection portion 42b of the piping connection unit 42 that guides refrigerant from the gas-liquid separator 27 to the compressor 21.

As a result, the refrigerant is guided downward in order from the gas-liquid separator 27 to the compressor 21, and it is thereby possible to simplify the piping configuration and to suppress liquid refrigerant and lubricating staying in the exterior heat exchanger 22 or in the piping.

Furthermore, in the air conditioning device 100, the refrigerant outlet 22b of the exterior heat exchanger 22 is located above the refrigerant inlet 22a thereof, and the gas-liquid separator 27 fits within the height dimension of the exterior heat exchanger 22.

As a result, the piping connecting the exterior heat exchanger 22 to the gas-liquid separator 27 can be shortened, and the height of the air conditioning device 100 as a whole can be reduced.

Furthermore, in the air conditioning device 100, the thermal expansion valve 25 and the heat exchanger for cooling 23 are disposed in the engine room 3 closer to the rear part thereof than the gas-liquid separator 27, and the first connection portion 42a is formed to face the rear of the vehicle.

As a result, since the first connection portion 42a is formed so as to face the thermal expansion valve 25 and the heat exchanger for cooling 23, the first connection piping 31 and the second connection piping 32 can be minimized in length.

Furthermore, in the air conditioning device 100, the second connection portion 42b is formed to face the lateral part of the vehicle.

As a result, since the third connection piping 33 bent rearward to face the compressor 21 is connected to face the lateral part of the vehicle, the routing of the piping can be simplified.

Note that the second connection portion 42b may be formed to face the front of the vehicle, and the third connection piping 33 may be disposed linearly with the second connection piping 32. In this case, since refrigerant does not change the direction within the piping connection unit 42 but changes the direction within the third connection piping 33, the refrigerant can flow smoothly.

Furthermore, in the air conditioning device 100, the piping connection unit 42 causes the second connection piping 32 and the third connection piping 33 to communicate with each other directly without passing through the tank unit 41 by means of actuation of the first flow path switching valve 28 during cooling operation.

Accordingly, providing the first flow path switching valve 28 integrally in the piping connection unit 42 can simplify the piping, and can simplify the configuration of the entire air conditioning device 100.

While certain embodiments of the present invention have been described, the above-described embodiments are merely illustrative of some application examples of the present invention, and are not intended to limit the technical scope of the present invention to the specific configurations of the above-described embodiment.

The invention claimed is:

1. An air conditioning device mounted on a vehicle, the air conditioning device comprising:
   a compressor configured to compress a refrigerant;
   an exterior heat exchanger configured to exchange heat between the refrigerant and external air;
   an evaporator configured to evaporate the refrigerant by having the refrigerant absorb heat from air guided into a vehicle compartment;
   a heater configured to heat air guided into the vehicle compartment by using heat from the refrigerant compressed by the compressor;
   an expansion valve provided between the exterior heat exchanger and the evaporator, the expansion valve being configured to decompress and expand the refrigerant that has passed through the exterior heat exchanger;
   a throttle mechanism provided between the compressor and the exterior heat exchanger, the throttle mechanism being configured to decompress and expand the refrigerant compressed by the compressor;
   a gas-liquid separator configured to separate liquid phase refrigerant and gas phase refrigerant from each other, the gas-liquid separator being configured to guide incoming gas phase refrigerant from the exterior heat exchanger into the compressor during a heating operation, the gas-liquid separator being configured to guide incoming liquid phase refrigerant from the exterior heat exchanger into the expansion valve during a cooling operation;

an internal heat exchanger located between the gas-liquid separator and the expansion valve, the internal heat exchanger being configured to receive the liquid phase refrigerant from the gas-liquid separator and evaporated refrigerant from the evaporator and facilitate heat exchange therebetween such that the liquid phase refrigerant is cooled by the evaporated refrigerant that has passed through the expansion valve; and a first flow path switching valve configured to switch a flow path of the refrigerant so as to bypass the expansion valve and the evaporator during the heating operation; wherein the gas-liquid separator includes:

a tank unit configured to store the refrigerant; and a piping connection unit on top of the tank unit, the piping connection unit including the first flow path switching valve and an inlet for the refrigerant into the tank unit and an outlet for the refrigerant from the tank unit, wherein the air conditioning device extends along a length that extends from a front end of the vehicle to a rear end of the vehicle to reduce piping requirements, the air conditioning device being configured such that:

the gas-liquid separator is located rearwardly of the exterior heat exchanger such that the gas-liquid separator is disposed closer to the rear end of the vehicle than the exterior heat exchanger, the compressor is located rearwardly of the gas-liquid separator such that the compressor is disposed closer to the rear end of the vehicle than the gas-liquid separator, the exterior heat exchanger has a refrigerant outlet disposed above the piping connection unit and a refrigerant inlet below the piping connection unit, and the compressor has a refrigerant suction inlet disposed below the piping connection unit the refrigerant suction inlet being connected to the gas-liquid separator via the piping connection unit.

2. The air conditioning device according to claim 1, wherein the refrigerant suction inlet is disposed below a compressor piping connection portion of the piping connection unit, the compressor piping connection portion guiding the refrigerant from the gas-liquid separator into the compressor.

3. The air conditioning device according to claim 2, wherein the evaporator is disposed in the vehicle closer to the rear end of the vehicle than the gas-liquid separator, the piping connection unit includes an evaporator piping connection portion to which a first connection piping and a second connection piping are connected, the first connection piping being configured to guide the refrigerant towards the expansion valve and the evaporator, and the second connection piping being configured to guide the refrigerant away from the expansion valve and the evaporator, and the evaporator piping connection portion is formed to face the rear end of the vehicle.

4. The air conditioning device according to claim 3, wherein the compressor piping connection portion is formed to face a lateral part of the vehicle, and a third connection piping is connected to the compressor piping connection portion, the third connection piping connecting the gas-liquid separator and the compressor to each other.

5. The air conditioning device according to claim 4, wherein the piping connection unit allows the second connection piping and the third connection piping to directly communicate with each other without passing through the tank unit by means of actuation of the first flow path switching valve during the cooling operation.

6. The air conditioning device according to claim 3, wherein the compressor piping connection portion is formed to face a front part of the vehicle, and a third connection piping is connected to the compressor piping connection portion, the third connection piping connecting the gas-liquid separator and the compressor to each other, and the third connection piping is disposed on a straight line together with the second connection piping.

7. The air conditioning device according to claim 1, further comprising a single air mix door configured to adjust air flow through the heater.

8. The air conditioning device according to claim 7, wherein the single air mix door is repositionable between a variety of positions to adjust heat exchange via the heater.

* * * * *